US012663433B2

(12) United States Patent
Nozawa

(10) Patent No.: US 12,663,433 B2
(45) Date of Patent: Jun. 23, 2026

(54) AUTOMATIC SAMPLE INJECTION DEVICE AND METHOD OF CONTROLLING AUTOMATIC SAMPLE INJECTION DEVICE

(71) Applicant: SHIMADZU CORPORATION, Kyoto (JP)

(72) Inventor: Tomonori Nozawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 619 days.

(21) Appl. No.: 18/039,376

(22) PCT Filed: Dec. 3, 2020

(86) PCT No.: PCT/JP2020/045079
§ 371 (c)(1),
(2) Date: May 30, 2023

(87) PCT Pub. No.: WO2022/118436
PCT Pub. Date: Jun. 9, 2022

(65) Prior Publication Data
US 2024/0003928 A1     Jan. 4, 2024

(51) Int. Cl.
*G01N 35/10*        (2006.01)
(52) U.S. Cl.
CPC ................................ *G01N 35/1011* (2013.01)
(58) Field of Classification Search
CPC ............... G01N 35/04; G01N 35/1011; G01N 2035/0441; G01N 2035/0475; G01N 2035/0491; G01N 2021/8455
See application file for complete search history.

(56) References Cited

U.S. PATENT DOCUMENTS

2009/0308470 A1*  12/2009  Bergstrom ....... G01N 35/00732
                                         137/624.11
2016/0245730 A1    8/2016  Neal
2019/0302068 A1   10/2019  Tolley et al.

FOREIGN PATENT DOCUMENTS

JP        02-246796 A      10/1990

OTHER PUBLICATIONS

International Search Report of PCT/JP2020/045079 dated Feb. 16, 2021 [PCT/ISA/210].
Written Opinion of PCT/JP2020/045079 dated Feb. 16, 2021 [PCT/ISA/237].
Communication dated Jun. 12, 2025 in Chinese Application No. 202080107491.3.

* cited by examiner

*Primary Examiner* — Duane Smith
*Assistant Examiner* — Austin Q Le
(74) *Attorney, Agent, or Firm* — Sughrue Mion, PLLC

(57)            ABSTRACT
A controller (14) slows down and stops a turret (12) when a sensor 33 detects a first detection target portion (31) in a detection area (34). The controller (14) acquires information corresponding to the movement distance (D1) of the first detection target portion (31) from the start of slowdown of the turret (12) to the stop of the turret (12). The controller (14) moves the first detection target portion (31) in a second direction (A2) by the movement distance (D1). The controller (14) moves the first detection target portion (31) in the second direction (A2) to a second position (P6) outside the detection area (34). The controller (14) moves the turret (12) to move the first detection target portion (31) in a first direction (A1) from the second position (P6) to an origin (P0).

7 Claims, 8 Drawing Sheets

AUTOMATIC SAMPLE INJECTION DEVICE AND METHOD OF CONTROLLING AUTOMATIC SAMPLE INJECTION DEVICE

CROSS REFERENCE TO RELATED APPLICATIONS

This application is a National Stage of International Application No. PCT/JP2020/045079, filed Dec. 3, 2020.

TECHNICAL FIELD

The present invention relates to an automatic sample injection device and a method of controlling the automatic sample injection device.

BACKGROUND ART

For an analysis device such as a gas chromatograph, an automatic sample injection device configured to automatically inject a sample is used. The automatic sample injection device includes a turret on which vials containing, e.g., the sample are mounted. The turret is moved by a stepping motor. A controller of the automatic sample injection device controls the stepping motor to move the turret to a desired position.

For example, at the start of the automatic sample injection device, return-to-origin control of adjusting a turret reference position to the origin of the automatic sample injection device is performed. The turret reference position is set on the turret. The turret has a detection target portion indicating the turret reference position. The automatic sample injection device includes a sensor having a predetermined detection area. The sensor detects the presence or absence of the detection target portion in the detection area. For example, the sensor is a photosensor, and irradiates the detection area with light. The sensor detects blocking of the light by the detection target portion in the detection area.

In the return-to-origin control, the controller moves the turret to move the turret reference position toward the origin. Then, the controller stops the turret when the sensor detects the detection target portion. In order to quickly complete the return-to-origin control, the turret is preferably moved at high speed. However, in this case, if the turret is suddenly stopped when the sensor detects the detection target portion, there is a probability that the step-out of the stepping motor occurs. Thus, in order to prevent the step-out, the controller stops the turret after having slowed down the turret.

In some cases, the turret includes a detection target portion (hereinafter, referred to as a second detection target portion) used for other purposes in addition to the detection target portion (hereinafter, referred to as a first detection target portion) indicating the turret reference position. For example, in order to identify the type of turret, the second detection target portion is provided at the turret. In this case, in the return-to-origin control, when the controller slows down and stops the turret, the first detection target portion moves beyond the detection area, leading to erroneous detection of the second detection target portion by the sensor. In order to prevent such erroneous detection, the controller may store the movement distance of the first detection target portion from the time of detection of the first detection target portion to the time of stop of the turret.

For example, in a stepping motor return-to-origin method of Patent Document 1, a controller accumulates the number of pulses input to a stepping motor from the start of drive of the stepping motor. When an origin detector detects an origin, the controller slows down and stops the stepping motor. The controller calculates the amount of movement to the origin from the number of pulses from the time of detection of the origin to the time of stop of the stepping motor. Then, the controller moves the stepping motor in the opposite direction by the movement amount.

Patent Document 1: JP-A-02-246796

SUMMARY OF THE INVENTION

Problems to be Solved by the Invention

As described above, in the return-to-origin control, in a case where the turret is moved at high speed, the first detection target portion does not always enter the detection area of the sensor at a constant maximum speed. Depending on the position of the first detection target portion at the start of movement of the turret, the first detection target portion might enter the detection area while speeding up before reaching the maximum speed. In this case, the calculated movement amount varies, and it is difficult to adjust the turret reference position to the origin with a favorable accuracy.

An object of the present invention is to quickly perform return-to-origin control with a favorable accuracy in an automatic sample injection device including a turret with multiple detection target portions.

Solutions to the Problems

An automatic sample injection device according to one aspect of the present invention includes a turret, a stepping motor, a sensor, and a controller. The turret has multiple detection target portions. The multiple detection target portions include a first detection target portion indicating a turret reference position. The turret is supported so as to move in a first direction and a second direction opposite to the first direction. The stepping motor moves the turret. The sensor has a detection area including an origin. The sensor outputs a signal indicating the presence or absence of any of the multiple detection target portions in the detection area. The controller receives the signal from the sensor. The controller controls the stepping motor to move the turret. In return-to-origin control of adjusting the turret reference position to the origin, the controller executes the following process. The controller moves the turret to move the first detection target portion from an initial position at the start of the return-to-origin control in the first direction. The controller slows down and stops the turret when the sensor detects the first detection target portion in the detection area while the first detection target portion is moving in the first direction. The controller acquires information corresponding to the movement distance of the first detection target portion from the start of slowdown of the turret to the stop of the turret. The controller moves the turret to move the first detection target portion in the second direction from a first position, at which the first detection target portion is positioned at the stop of the turret, by the movement distance. The controller moves the turret to move the first detection target portion in the second direction to a second position outside the detection area. The controller moves the turret to move the first detection target portion in the first direction from the second position to the origin.

A method according to another aspect of the present invention is a method of adjusting a turret reference position to an origin in an automatic sample injection device. The automatic sample injection device includes a turret, a stepping motor, and a sensor. The turret has multiple detection target portions. The multiple detection target portions include a first detection target portion indicating the turret reference position. The turret is supported so as to move in a first direction and a second direction opposite to the first direction. The stepping motor moves the turret. The sensor has a detection area including the origin. The sensor outputs a signal indicating the presence or absence of any of the multiple detection target portions in the detection area.

The method according to this aspect includes moving the turret to move the first detection target portion from an initial position at the start of return-to-origin control in the first direction, slowing down and stopping the turret when the sensor detects the first detection target portion in the detection area while the first detection target portion is moving in the first direction, acquiring information corresponding to the movement distance of the first detection target portion from the start of slowdown of the turret to the stop of the turret, moving the turret to move the first detection target portion in the second direction from a first position, at which the first detection target portion is positioned at the stop of the turret, by the movement distance, moving the turret to move the first detection target portion in the second direction to a second position outside the detection area, and moving the turret to move the first detection target portion in the first direction from the second position to the origin.

Effects of the Invention

According to the present invention, in the return-to-origin control, when the sensor detects the first detection target portion in the detection area, the turret is slowed down and stopped. Thus, the turret can be moved at high speed while the step-out of the stepping motor is prevented. Thus, the return-to-origin control can be quickly performed. After the turret has been stopped, the first detection target portion returns by the movement distance from the start of slowdown to the stop. Thus, erroneous detection of the other detection target portion by the sensor is prevented. The first detection target portion further returns to the second position outside the detection area, and thereafter, moves to the origin. Thus, the turret reference position can be adjusted to the origin with a favorable accuracy.

EMBODIMENT FOR CARRYING OUT THE INVENTION

Figure 1:
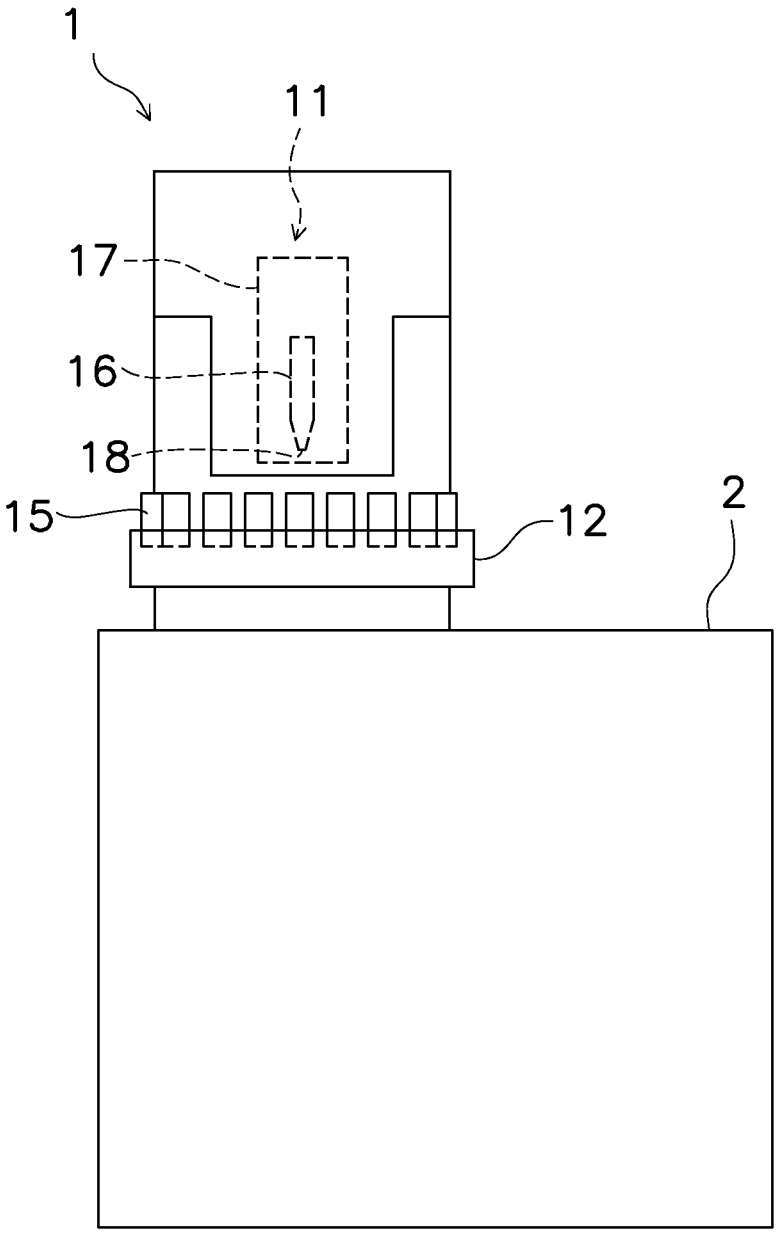
FIG. 1 is a front view of an automatic sample injection device according to an embodiment.

Hereinafter, an automatic sample injection device 1 according to an embodiment will be described with reference to the drawings. FIG. 1 is a front view of the automatic sample injection device 1. The automatic sample injection device 1 is arranged on an analysis device 2. The analysis device 2 is, for example, a gas chromatograph. Note that the analysis device 2 may be a device other than the gas chromatograph. The automatic sample injection device 1 automatically injects a sample into the analysis device 2.

Figure 2:
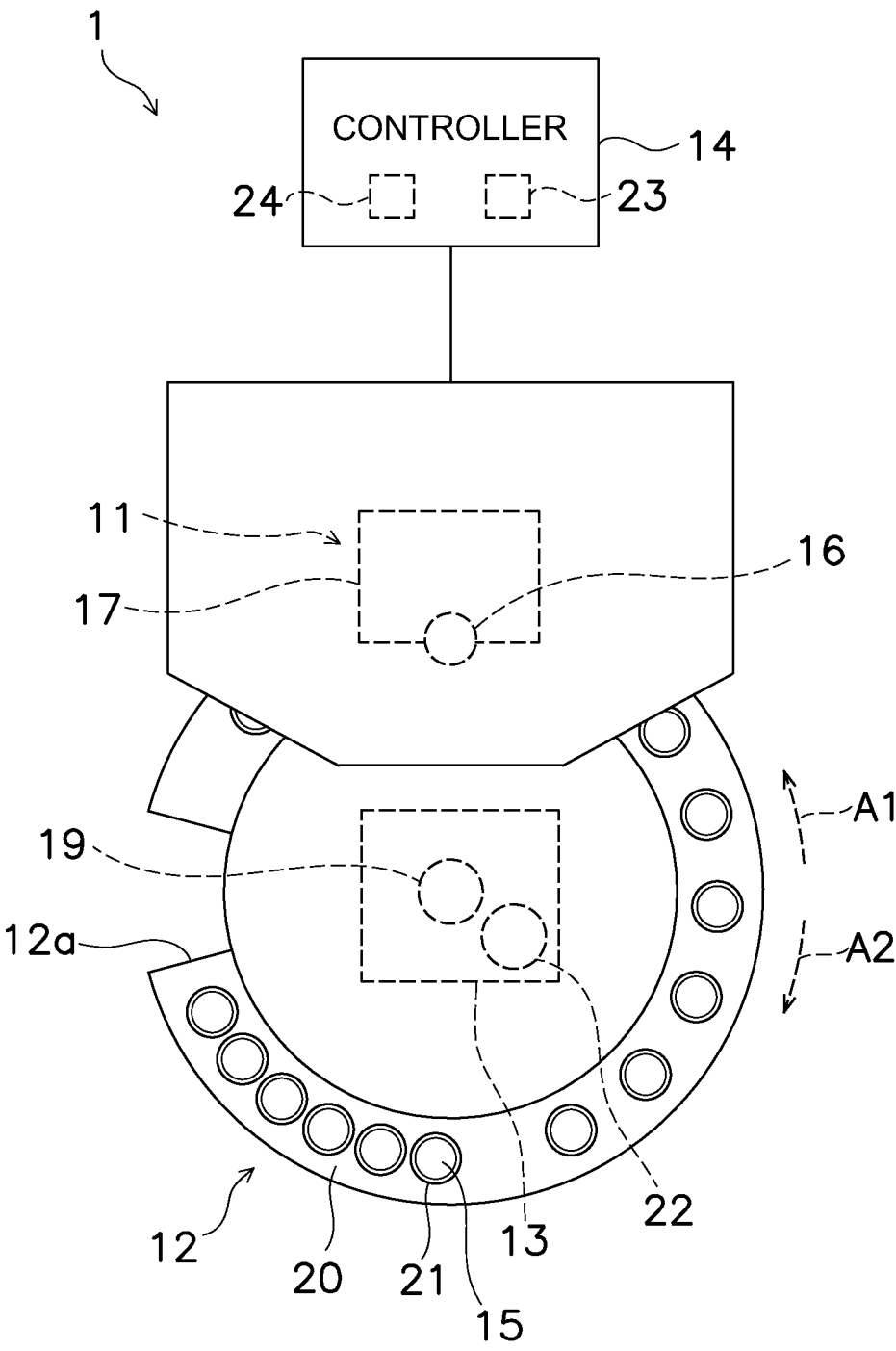
FIG. 2 is a top view of the automatic sample injection device.

FIG. 2 is a top view of the automatic sample injection device 1. As shown in FIG. 2, the automatic sample injection device 1 includes a sampling mechanism 11, a turret 12, a turret drive mechanism 13, and a controller 14. The sampling mechanism 11 collects the sample from vials 15 arranged on the turret 12, and injects the sample into the analysis device 2. Note that in the drawing, only some of the vials 15 are shown with a reference numeral 15 and the other vials are not shown with the reference numeral.

The sampling mechanism 11 includes a syringe 16 and a syringe drive mechanism 17. The syringe 16 includes a tip end 18, and sucks and discharges the sample through the tip end 18. The syringe 16 is arranged with the tip end 18 facing down. The analysis device 2 includes an injection port that injects the sample into the analysis device 2. The syringe 16 is arranged above the injection port. The syringe 16 is supported on the syringe drive mechanism 17 so as to move in an up-down direction. The syringe drive mechanism 17 includes an actuator such as a motor. The syringe drive mechanism 17 moves the syringe 16 in the up-down direction.

The turret 12 is supported so as to rotate about a rotor shaft 19. The turret 12 includes a circular table 20 and multiple vial holders 21. The multiple vial holders 21 are arranged on the upper surface of the table 20. The multiple vial holders 21 are arranged in a circular pattern. The vial storing, e.g., the sample is arranged in the vial holder 21. Note that in the drawing, only some of the multiple vial holders 21 are shown with a reference numeral 21 and the other vial holders 21 are not shown with the reference numeral. The turret 12 rotates to change the vial 15 to be arranged below the syringe 16. The table 20 includes a blank portion 12a. The blank portion 12a penetrates the table 20 up and down. In a state in which the blank portion 12a is arranged below the syringe 16, the syringe 16 is movable toward the injection port.

The turret drive mechanism. 13 rotates the turret 12. The turret drive mechanism 13 includes a stepping motor 22. The stepping motor 22 is connected to the rotor shaft 19 of the turret 12, for example, via a not-shown gear mechanism. The stepping motor 22 rotates according to an input pulse signal. The stepping motor 22 rotates a predetermined angle according to one pulse signal. The stepping motor 22 rotates at a rotation speed corresponding to the frequency of the pulse signal. According to the direction of rotation of the stepping motor 22, the turret 12 rotates in a first direction A1 or a second direction A2 opposite to the first direction A1. Note that the first direction A1 and the second direction A2 are not limited to those shown in the figure and may be the opposite directions.

The controller 14 includes a storage device 23 and a processor 24. The storage device 23 includes a memory such as a random access memory (RAM) or a read only memory (ROM). The storage device 23 may include a storage such as a solid state drive (SSD) or a hard disk drive (HDD). The storage device 23 stores a program and data for controlling the automatic sample injection device 1. The processor 24 executes process of controlling the automatic sample injection device 1 according to the program and data stored in the storage device 23.

The controller 14 inputs the pulse signal to the stepping motor 22, thereby controlling the stepping motor 22. The controller 14 controls the angle, speed, and direction of rotation of the stepping motor 22. The controller 14 controls the stepping motor 22, thereby controlling the position of the turret 12. The controller 14 stores arrangement of the vial holders 21 of the turret 12. The controller 14 rotates the turret 12 to move a desired vial holder 21 to below the syringe 16. Accordingly, a desired vial 15 is arranged below the syringe 16, and the sample can be extracted from the vial 15 by the syringe 16. Moreover, the controller 14 rotates the turret 12, thereby moving the blank portion 12*a* to below the syringe 16. Accordingly, the syringe 16 can access the injection port of the analysis device 2.

Figure 3:
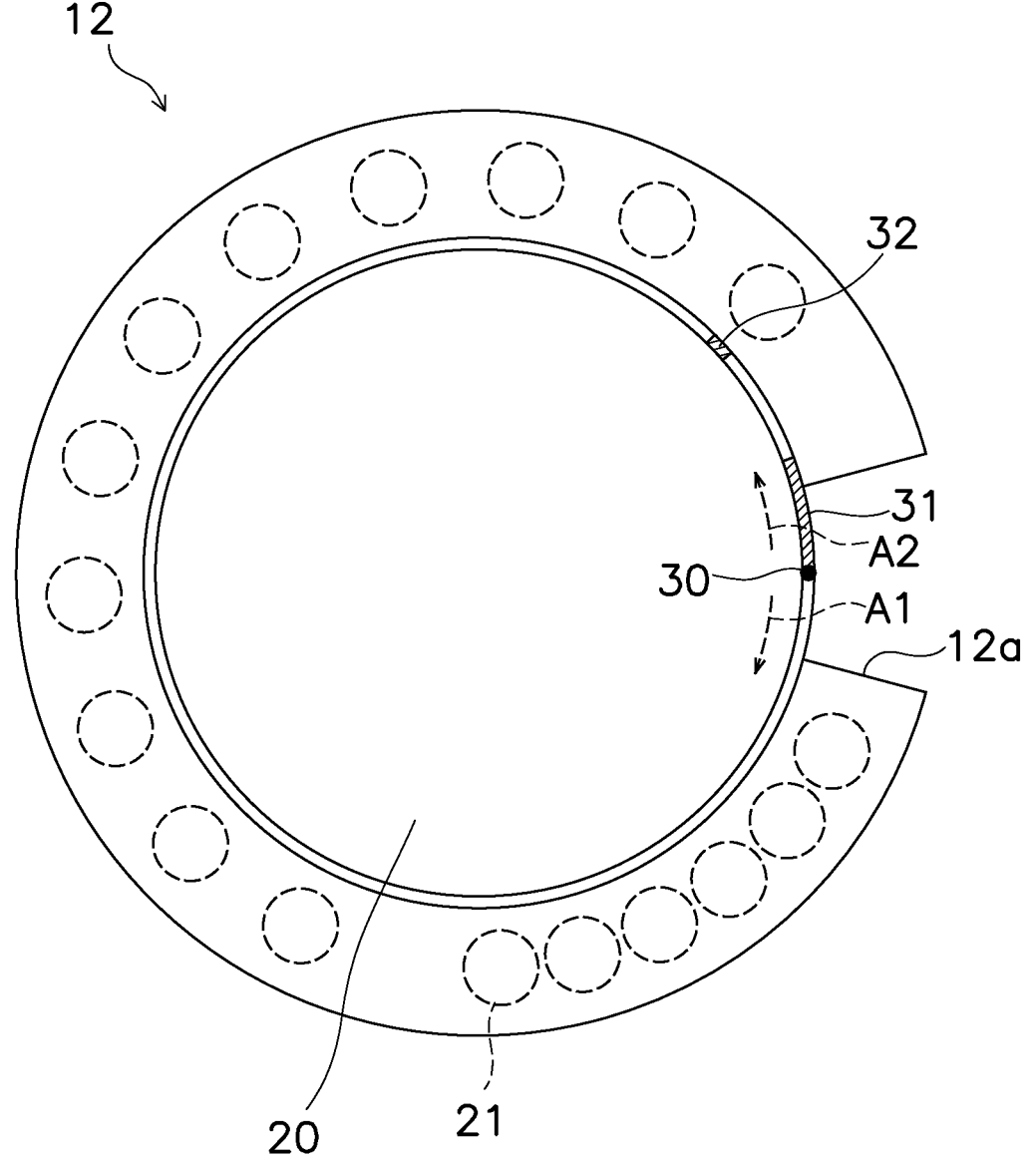
FIG. 3 is a bottom view of a turret.
Figure 4:
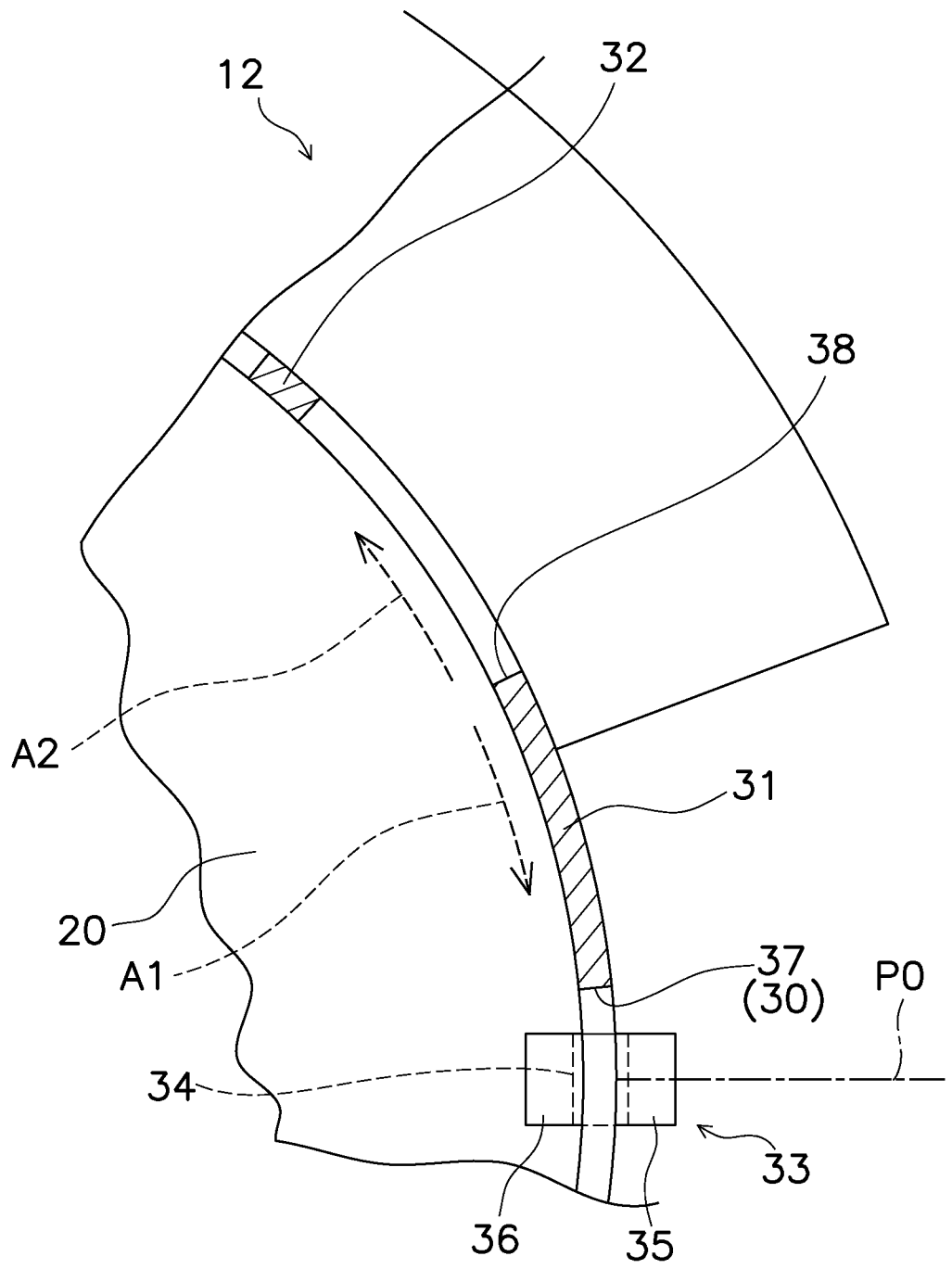
FIG. 4 is an enlarged view of the bottom of the turret.

Next, return-to-origin control of adjusting a turret reference position 30 to the origin P0 of the automatic sample injection device 1 will be described. FIG. 3 is a bottom view of the turret 12. FIG. 4 is an enlarged view of the bottom of the turret 12. The turret reference position 30 is a predetermined reference position on the turret 12. The turret reference position 30 is fixed on the turret 12, and rotates together with the turret 12. The origin P0 is set on the automatic sample injection device 1. The origin P0 is fixed on the automatic sample injection device 1, and is unmovable regardless of rotation of the turret 12.

As shown in FIGS. 3 and 4, the turret 12 includes multiple detection target portions 31, 32. The multiple detection target portions 31, 32 protrude downward from the bottom of the table 20. The multiple detection target portions 31, 32 extend along the circumferential direction of the turret 12. The multiple detection target portions 31, 32 include a first detection target portion 31 and a second detection target portion 32. The first detection target portion 31 and the second detection target portion 32 are arranged with a space therebetween in the circumferential direction of the turret 12. The first detection target portion 31 is longer than the second detection target portion 32 in the circumferential direction of the turret 12. The first detection target portion 31 is used for the return-to-origin control. The second detection target portion 32 is used for a purpose different from the return-to-origin control. For example, the second detection target portion 32 is used for identifying the type of turret 12.

As shown in FIG. 4, the automatic sample injection device 1 includes a sensor 33. The sensor 33 has a detection area 34 including the origin P0. The sensor 33 detects the presence or absence of the multiple detection target portions 31, 32 in the detection area 34. The sensor 33 is, for example, a photosensor, and includes a light projector 35 and a light receiver 36. The light projector 35 irradiates the detection area 34 with light. The light receiver 36 detects light to output a signal corresponding to the amount of detected light. When either of the multiple detection target portions 31, 32 enters the detection area 34, the amount of light received by the light receiver 36 changes. The controller 14 receives a signal from the sensor 33. According to the signal from the sensor 33, the controller 14 detects presence or absence of the multiple detection target portions 31, 32 in the detection area 34. Note that in FIG. 4, the sensor 33 is of a transmission type, but may be a reflection type.

As shown in FIG. 4, the first detection target portion 31 includes a first end portion 37 and a second end portion 38. The second end portion 38 is positioned opposite to the first end portion 37 in the circumferential direction of the turret 12. The first detection target portion 31 indicates the turret reference position 30. In the present embodiment, the turret reference position 30 is the first end portion 37 of the first detection target portion 31. Note that the turret reference position 30 may be another portion of the first detection target portion 31.

Figure 5:
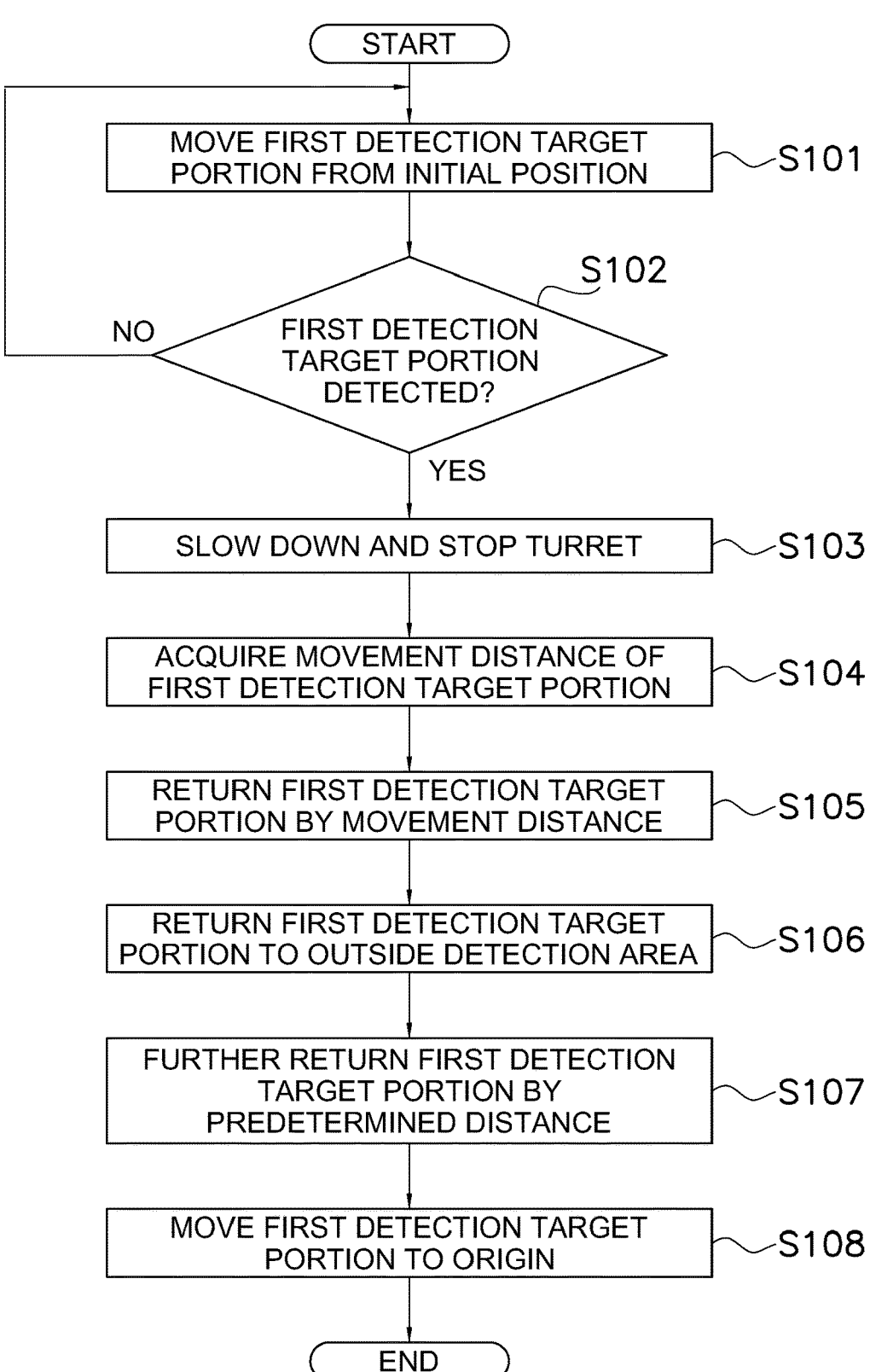
FIG. 5 is a flowchart showing processing in return-to-origin control.
Figure 6:
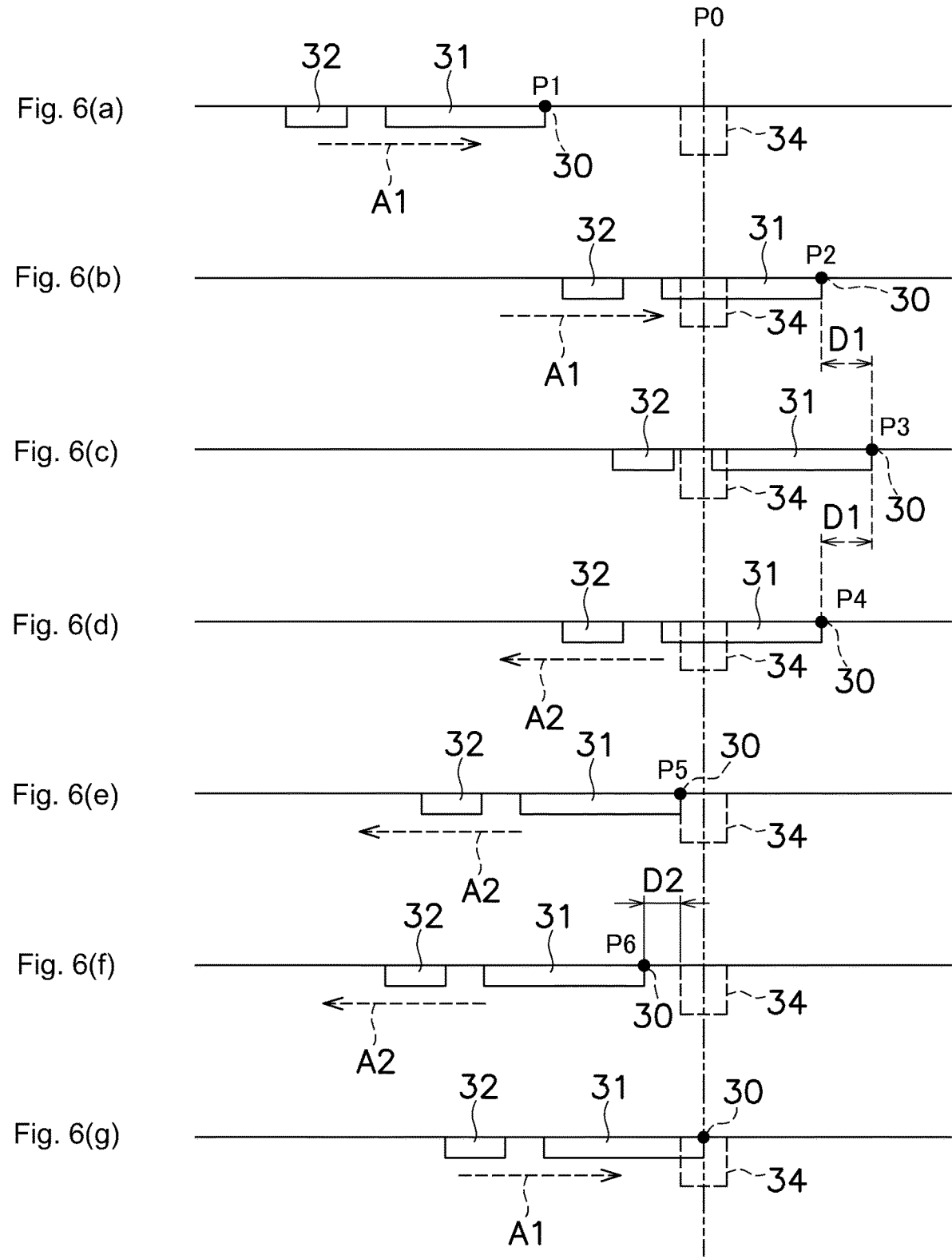
FIGS. 6(a) to 6(g) are views schematically showing the positions of a first detection target portion and a detection area of a sensor in the return-to-origin control.

FIG. 5 is a flowchart showing the process in the return-to-origin control. FIGS. 6(*a*) to 6(*g*) are views schematically showing the positions of the first detection target portion 31 and the detection area 34 of the sensor 33.

As shown in FIG. 5, in Step S101, the controller 14 moves the first detection target portion 31 from an initial position P1. The initial position P1 is the position of the first detection target portion 31 at the time of the start of the return-to-origin control. The controller 14 rotates the turret 12 in the first direction A1, and accordingly, the first detection target portion 31 moves from the initial position P1 in the first direction A1 as shown in FIG. 6(*a*).

In Step S102, the controller 14 determines whether or not the sensor 33 has detected the first detection target portion 31 in the detection area 34. The controller 14 calculates, from the signal from the sensor 33, the length of the detection target portion detected in the detection area 34. When the length of the detected detection target portion is a predetermined threshold or more, the controller 14 determines that the first detection target portion 31 has been detected in the detection area 34. Thus, the controller 14 does not stop the first detection target portion 31, but continuously moves the first detection target portion 31 in the first direction A1 even after the first detection target portion 31 has entered the detection area 34. Thus, as shown in FIG. 6 (*b*), the first detection target portion 31 moves beyond the detection area 34. Note that the predetermined threshold is greater than the length of the second detection target portion 32 and equal to or less than the length of the first detection target portion 31. When it is determined that the sensor 33 has detected the first detection target portion 31 in the detection area 34, the controller 14 proceeds the process to Step S103.

In Step S103, the controller 14 slows down and stops the turret 12. At this point, the controller 14 starts slowing down the first detection target portion 31 at a position P2 shown in FIG. 6(*b*). After the turret 12 has slowed down to such a speed that step-out does not occur, the controller 14 stops the turret 12. Thus, the first detection target portion 31 stops at a position P3 (first position) shown in FIG. 6(*c*).

In Step S104, the controller 14 acquires the movement distance D1 of the first detection target portion 31 from the start of slowdown of the turret 12 to the stop of the turret 12. The movement distance D1 is a distance between the position P2 at which the first detection target portion 31 starts slowing down and the position P3 at which the first detection target portion 31 stops. The controller 14 calculates the movement distance D1 of the first detection target portion 31 from the number of pulse signals input to the stepping motor 22 until the turret 12 stops after the start of slowdown of the turret 12. The controller 14 may store the calculated movement distance D1, or may store the number of pulse signals as information corresponding to the movement distance D1.

In Step S105, the controller 14 returns the first detection target portion 31 by the movement distance D1. At this point, the controller 14 rotates the turret 12 in the second direction A2, thereby moving the first detection target portion 31 from the position P3 in the second direction A2 by the movement distance D1 as shown in FIG. 6 (*d*). Accordingly, the first detection target portion 31 moves to a position P4 apart from the position P3 by the movement distance D1 in the second direction A2.

In Step S106, the controller 14 returns the first detection target portion 31 to the outside of the detection area 34. At this point, the controller 14 rotates the turret 12 in the second direction A2, thereby moving the first detection target portion 31 to a position P5 (third position) as shown in FIG. 6 (e). The controller 14 rotates the turret 12 in the second direction A2 until the first detection target portion 31 is no longer detected in the detection area 34 from the signal of the sensor 33. The position P5 is the position of the first detection target portion 31 when the sensor 33 detects the absent of the first detection target portion 31 in the detection area 34.

In Step S107, the controller 14 further returns the first detection target portion 31 by a predetermined distance D2. At this point, the controller 14 rotates the turret 12 in the second direction A2, thereby moving the first detection target portion 31 from the position P5 to a position P6 (second position) outside the detection area 34 and stopping the first detection target portion 31 at the position P6, as shown in FIG. 6(f). The position P6 is a position apart from the detection area 34 in the second direction A2 by the predetermined distance D2. The predetermined distance D2 is, for example, preferably such a distance that the first detection target portion 31 is not detected by the sensor 33 even if the first detection target portion 31 moves due to vibration of the turret 12 upon stop thereof.

In Step S108, the controller 14 moves the first detection target portion 31 to the origin P0. At this point, the controller 14 rotates the turret 12 in the first direction A1, thereby moving the first detection target portion 31 from the position P6 to the origin P0 in the first direction A1. As shown in FIG. 6(g), when the turret reference position 30 becomes coincident with the origin P0, the controller 14 stops the turret 12. In the above-described manner, the controller 14 executes the return-to-origin control of adjusting the turret reference position 30 to the origin P0.

Figure 7:
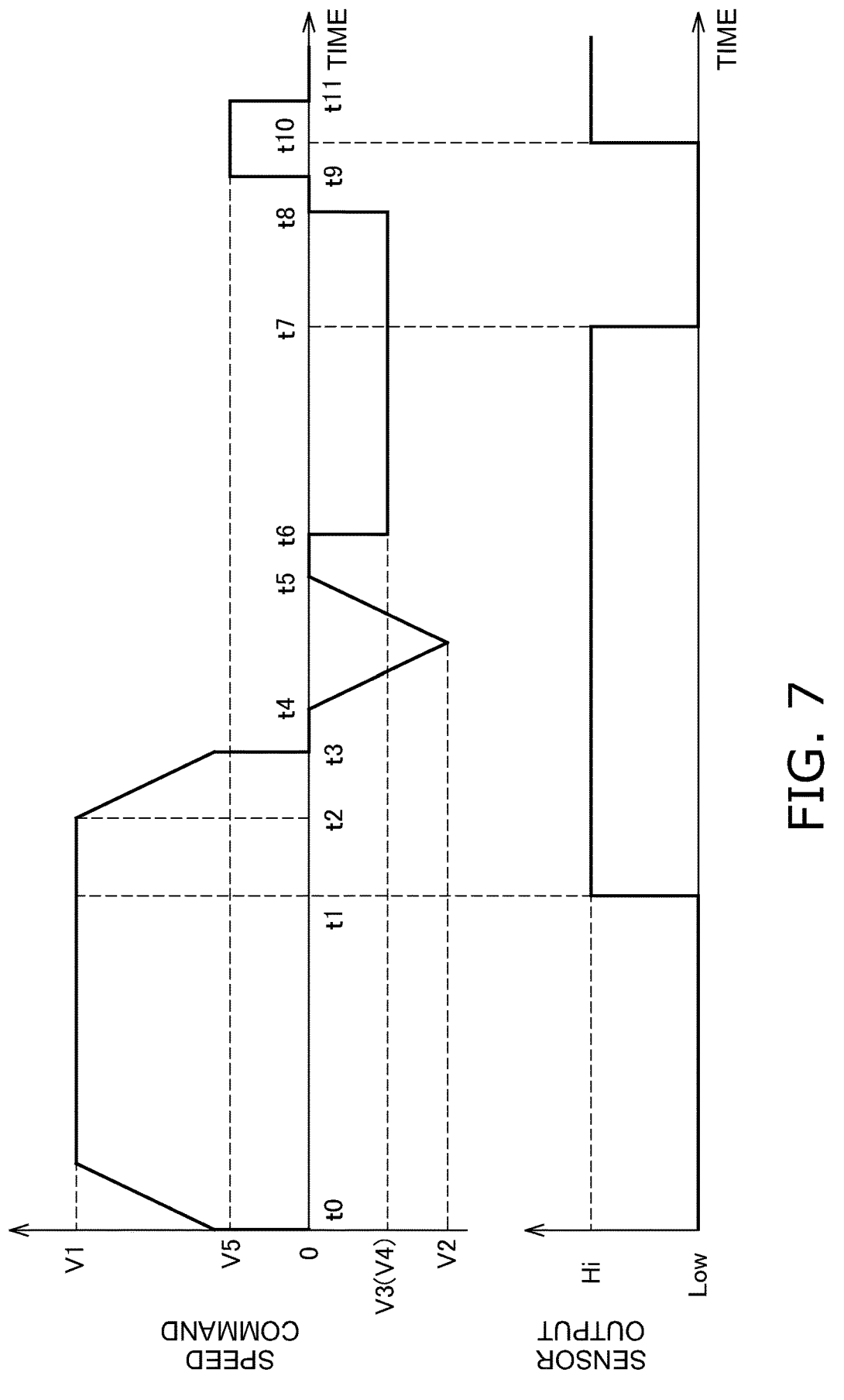
FIG. 7 is a timing chart of a speed commend to a stepping motor and a signal from the sensor in the return-to-origin control.

FIG. 7 is a timing chart of a speed command to the stepping motor 22 in the return-to-origin control and the signal from the sensor 33. The controller 14 inputs, to the stepping motor 22, the pulse signal corresponding to the speed command. In FIG. 7, the signal "Low" from the sensor 33 indicates that the detection target portion 31, 32 is not positioned in the detection area 34. The signal "Hi" from the sensor 33 indicates that any of the detection target portions 31, 32 is positioned in the detection area 34. Conversely, "Low" may mean that any of the detection target portions 31, 32 is positioned in the detection area 34, and "Hi" may mean that the detection target portion 31, 32 is not positioned in the detection area 34.

When the first detection target portion 31 moves from the initial position P1 as shown in FIG. 6 (a), the controller 14 speeds up the first detection target portion 31 to a speed V1 (first speed) in the first direction A1 from a time point t0 as shown in FIG. 7. After the speed of the first detection target portion 31 has reached the speed V1, the controller 14 moves the first detection target portion 31 at the constant speed V1.

At a time point t1, the controller 14 moves the first detection target portion 31 at the constant speed V1 even after the first detection target portion 31 has entered the detection area 34. The controller 14 determines that the first detection target portion 31 has been detected at a time point t2, and starts slowing down the first detection target portion 31 from the time point t2. At the time point t2, the first detection target portion 31 is at the position P2 shown in FIG. 6(b). Then, at a time point t3, when the speed of the first detection target portion 31 reaches a predetermined speed threshold or less, the controller 14 stops the first detection target portion 31. At this point, the first detection target portion 31 is at the position P3 shown in FIG. 6(c). The controller 14 acquires the movement distance D1 of the first detection target portion 31 from the time point t2 to the time point t3.

After the first detection target portion 31 has stopped, the controller 14 speeds up the first detection target portion 31 in the second direction A2 from a time point t4. After the speed of the first detection target portion 31 has reached a speed V2 (third speed), the controller 14 slows down the first detection target portion 31, and stops the first detection target portion 31 at a time point t5. From the time point t4 to the time point t5, the first detection target portion 31 moves in the second direction A2 from the position P3 by the movement distance D1, and moves to the position P4 shown in FIG. 6(d).

From a time point t6, the controller 14 moves the first detection target portion 31 in the second direction A2 from the position P4 at a constant speed V3. The controller 14 moves the first detection target portion 31 in the second direction A2 at the constant speed V3 until the first detection target portion 31 moves out of the detection area 34 at a time point t7. The speed V3 is a speed lower than the speed V1. The speed V3 is lower than the speed V2. At the time point t7, the first detection target portion 31 is at the position P5 shown in FIG. 6(e). Note that in FIG. 7, the controller 14 temporarily stops the first detection target portion 31 between the time point t5 and the time point t6. However, the controller 14 may slow down the first detection target portion 31 from the speed V2, and may continuously move the first detection target portion 31 at the constant speed V3 without stopping the first detection target portion 31.

From the time point t7, the controller 14 moves the first detection target portion 31 in the second direction A2 at a constant speed V4 (fourth speed) by the predetermined distance D2. Accordingly, the first detection target portion 31 moves to the position P6 shown in FIG. 6(f), and stops at the position P6 at a time point t8. The speed V4 is a speed lower than the speed V1. The speed V4 is a speed lower than the speed V2. In FIG. 7, the speed V4 is the same speed as the speed V3, but may be a speed lower than the speed V3.

After the first detection target portion 31 has stopped at the position P6, the controller 14 moves, from a time point t9, the first detection target portion 31 in the first direction A1 at a constant speed V5. Accordingly, as shown in FIG. 6(g), the first detection target portion 31 moves toward the origin P0. The speed V5 is a speed lower than the speed V1. The speed V5 is a speed lower than the speed V2. The speeds V3, V4, V5 are such low speeds that the step-out of the stepping motor 22 does not occur even when the turret 12 is suddenly stopped. After the first detection target portion 31 has entered the detection area 34 at a time point t10, when the turret reference position 30 reaches the origin P0 at a time point t11, the controller 14 stops the first detection target portion 31.

One embodiment of the present invention has been described above, but the present invention is not limited to the above-described embodiment and various changes can be made without departing from the gist of the invention. Specifically, multiple embodiments and modifications described in the present specification may be combined as necessary.

The process in the return-to-origin control is not limited to that of the above-described embodiment, and part of the process may be changed or omitted. Process different from the process of the above-described embodiment may be added. The order of execution of the process steps in the return-to-origin control is not limited to the order described in the above-described embodiment, and may be changed.

Figure 8:
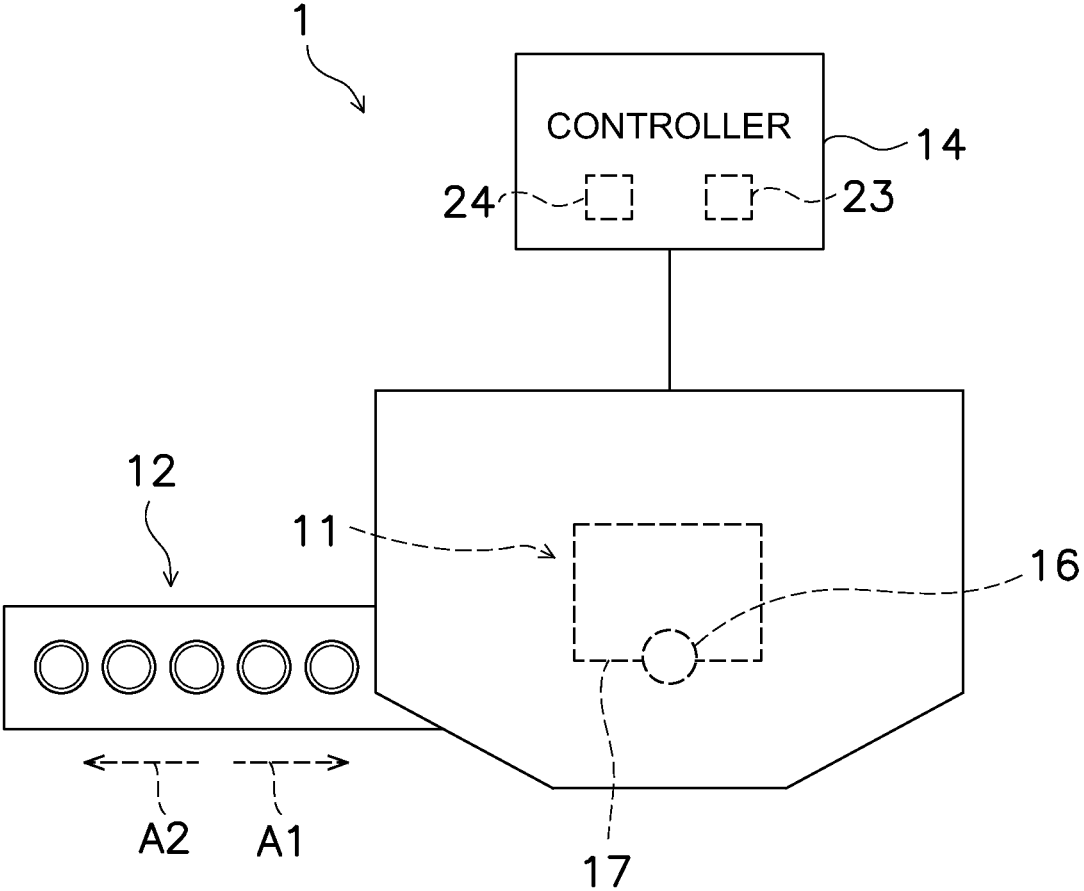
FIG. 8 is a top view of an automatic sample injection device according to a modification.

The configuration of the automatic sample injection device 1 is not limited to that of the above-described embodiment, and may be changed. For example, the shape of the turret 12 may be changed. The turret 12 is not limited to the rotating circular turret, and may be a linear turret configured to move linearly as shown in FIG. 8. The linear turret may be, for example, one disclosed in JP2012042253A. The shape or arrangement of the first detection target portion 31 or the second detection target portion 32 may be changed. The turret 12 may include three or more detection target portions. The sensor 33 is not limited to the photosensor, and may be another type of sensor such as a magnetic sensor.

In the above-described embodiment, the controller 14 moves the first detection target portion 31 from the position P6 to the origin P0 at the constant speed V5. However, the speed of movement of the first detection target portion 31 from the position P6 to the origin P0 is not limited to the constant speed, and may be a changing speed. The first detection target portion 31 moves from the position P6 to the origin P0 at such a low speed that the step-out of the stepping motor does not occur so that the turret reference position can be adjusted to the origin with a favorable accuracy. Note that the first detection target portion 31 moves from the position P6 to the origin P0 at the constant speed so that the turret reference position can be adjusted to the origin with a more-favorable accuracy.

Those skilled in the art understand that the above-described multiple exemplary embodiments are specific examples of the following aspects.

An automatic sample injection device according to a first aspect includes a turret, a stepping motor, a sensor, and a controller. The turret has multiple detection target portions. The multiple detection target portions include a first detection target portion indicating a turret reference position. The turret is supported so as to move in a first direction and a second direction opposite to the first direction. The stepping motor moves the turret. The sensor has a detection area including an origin. The sensor outputs a signal indicating the presence or absence of any of the multiple detection target portions in the detection area. The controller receives the signal from the sensor. The controller controls the stepping motor to move the turret. In return-to-origin control of adjusting the turret reference position to the origin, the controller executes the following process. The controller moves the turret to move the first detection target portion from an initial position at the start of the return-to-origin control in the first direction. The controller slows down and stops the turret when the sensor detects the first detection target portion in the detection area while the first detection target portion is moving in the first direction. The controller acquires information corresponding to the movement distance of the first detection target portion from the start of slowdown of the turret to the stop of the turret. The controller moves the turret to move the first detection target portion in the second direction from a first position, at which the first detection target portion is positioned at the stop of the turret, by the movement distance. The controller moves the turret to move the first detection target portion in the second direction to a second position outside the detection area. The controller moves the turret to move the first detection target portion in the first direction from the second position to the origin.

In the automatic sample injection device according to the first aspect, in the return-to-origin control, when the sensor detects the first detection target portion in the detection area, the turret is slowed down and stopped. Thus, the turret can be moved at high speed while the step-out of the stepping motor is prevented. Thus, the return-to-origin control can be quickly performed. After the turret has been stopped, the first detection target portion returns by the movement distance from the start of slowdown to the stop. Thus, erroneous detection of the other detection target portion by the sensor is prevented. The first detection target portion further returns to the second position outside the detection area, and thereafter, moves to the origin. Thus, the turret reference position can be adjusted to the origin with a favorable accuracy.

An automatic sample injection device according to a second aspect is the automatic sample injection device according to the first aspect. In this automatic sample injection device, the second position is a position apart from a third position in the second direction by a predetermined distance. The third position is the position of the first detection target portion when the sensor detects the absence of the first detection target portion in the detection area. In the automatic sample injection device according to the second aspect, erroneous detection by the sensor is prevented even if the first detection target portion moves due to, e.g., vibration of the turret.

An automatic sample injection device according to a third aspect is the automatic sample injection device according to the second aspect. In this automatic sample injection device, the controller moves the turret at a constant speed to move the first detection target portion in the first direction from the second position to the origin. In the automatic sample injection device according to the third aspect, the turret moves at the constant speed, and therefore, the turret reference position can be adjusted to the origin with a favorable accuracy.

An automatic sample injection device according to a fourth aspect is the automatic sample injection device according to the first aspect. In this automatic sample injection device, the controller moves the turret in the first direction at a first speed to move the first detection target portion from the initial position. The controller moves the turret in the first direction at a second speed lower than the first speed to move the first detection target portion from the second position to the origin. In the automatic sample injection device according to the fourth aspect, the first detection target portion moves from the initial position at the first speed higher than the second speed. Thus, the return-to-origin control can be quickly performed. Moreover, the first detection target portion moves to the origin at the second speed lower than the first speed. Thus, the turret reference position can be adjusted to the origin with a favorable accuracy.

An automatic sample injection device according to a fifth aspect is the automatic sample injection device according to the first aspect. In this automatic sample injection device, the controller moves the turret in the second direction at a third speed to move the first detection target portion from the first position by the movement distance. The controller moves the turret in the second direction at a fourth speed lower than the third speed to move the first detection target portion to the second position. In the automatic sample injection device according to the fifth aspect, the first detection target portion moves from the first position by the movement distance at the third speed higher than the fourth speed. Thus, the return-to-origin control can be quickly performed. Moreover, the first detection target portion moves to the second position at the fourth speed lower than the third speed. Thus, the first detection target portion can be moved to the second position outside the detection area with a favorable accuracy.

An automatic sample injection device according to a sixth aspect is the automatic sample injection device according to the first aspect. In this automatic sample injection device, the multiple detection target portions further include a second detection target portion arranged with a space from the first detection target portion. The first detection target portion is longer than the second detection target portion. The controller acquires, from the signal of the sensor, the length of any of the multiple detection target portions detected in the detection area. The controller determines, when the length is a predetermined threshold or more, that the first detection target portion has been detected in the detection area. In the automatic sample injection device according to the sixth aspect, determination on whether or not the first detection target portion has been detected can be made based on the length of the detection target portion detected by the sensor. Thus, the first detection target portion and the second detection target portion can be distinguished from each other with a favorable accuracy.

A method according to a seventh aspect is a method of adjusting a turret reference position to an origin in an automatic sample injection device. The automatic sample injection device includes a turret, a stepping motor, and a sensor. The turret has multiple detection target portions. The multiple detection target portions include a first detection target portion indicating the turret reference position. The turret is supported so as to move in a first direction and a second direction opposite to the first direction. The stepping motor moves the turret. The sensor has a detection area including the origin. The sensor outputs a signal indicating the presence or absence of any of the multiple detection target portions in the detection area.

The method according to the seventh aspect includes moving the turret to move the first detection target portion from an initial position at the start of return-to-origin control in the first direction, slowing down and stopping the turret when the sensor detects the first detection target portion in the detection area while the first detection target portion is moving in the first direction, acquiring information corresponding to the movement distance of the first detection target portion from the start of slowdown of the turret to the stop of the turret, moving the turret to move the first detection target portion in the second direction from a first position, at which the first detection target portion is positioned at the stop of the turret, by the movement distance, moving the turret to move the first detection target portion in the second direction to a second position outside the detection area, and moving the turret to move the first detection target portion in the first direction from the second position to the origin.

In the method according to the seventh aspect, in the return-to-origin control, when the sensor detects the first detection target portion in the detection area, the turret is slowed down and stopped. Thus, the turret can be moved at high speed while the step-out of the stepping motor is prevented. Thus, the return-to-origin control can be quickly performed. After the turret has been stopped, the first detection target portion returns by the movement distance from the start of slowdown to the stop. Thus, erroneous detection of the other detection target portion by the sensor is prevented. The first detection target portion further returns to the second position outside the detection area, and thereafter, moves to the origin. Thus, the turret reference position can be adjusted to the origin with a favorable accuracy.

INDUSTRIAL APPLICABILITY

According to the present invention, the return-to-origin control can be quickly performed with a favorable accuracy in the automatic sample injection device including the turret with the multiple detection target portions.

DESCRIPTION OF REFERENCE SIGNS

12 Turret
14 Controller
22 Stepping Motor
30 Turret Reference Position
31 First Detection Target Portion
32 Second Detection Target Portion
33 Sensor
34 Detection Area
A1 First Direction
A2 Second Direction
D1 Movement Distance
D2 Predetermined Distance
P0 Origin
P1 Initial Position
P3 First Position
P6 Second Position
P5 Third Position
V1 First Speed
V5 Second Speed
V2 Third Speed
V4 Fourth Speed

The invention claimed is:

1. An automatic sample injection device comprising:
   a turret having multiple detection target portions including a first detection target portion indicating a turret reference position and supported so as to move in a first direction and a second direction opposite to the first direction;
   a stepping motor moving the turret;
   a sensor having a detection area including an origin and outputting a signal indicating a presence or absence of any of the multiple detection target portions in the detection area; and
   a controller receiving the signal from the sensor and controlling the stepping motor to move the turret,
   wherein in return-to-origin control of adjusting the turret reference position to the origin, the controller
   moves the turret to move the first detection target portion from an initial position at a start of the return-to-origin control in the first direction,
   slows down and stops the turret when the sensor detects the first detection target portion in the detection area while the first detection target portion is moving in the first direction,
   acquires information corresponding to a movement distance of the first detection target portion from a start of slowdown of the turret to stop of the turret,
   moves the turret to move the first detection target portion in the second direction from a first position, at which the first detection target portion is positioned at the stop of the turret, by the movement distance,
   moves the turret to move the first detection target portion in the second direction to a second position outside the detection area, and
   moves the turret to move the first detection target portion in the first direction from the second position to the origin.

2. The automatic sample injection device according to claim 1, wherein the second position is a position apart from a third position in the second direction by a predetermined distance, the third position being a position of the first detection target portion when the sensor detects an absence of the first detection target portion in the detection area.

3. The automatic sample injection device according to claim 2, wherein the controller moves the turret at a constant speed to move the first detection target portion in the first direction from the second position to the origin.

4. The automatic sample injection device according to claim 1, wherein the controller moves the turret in the first direction at a first speed to move the first detection target portion from the initial position, and moves the turret in the first direction at a second speed lower than the first speed to move the first detection target portion from the second position to the origin.

5. The automatic sample injection device according to claim 1, wherein the controller moves the turret in the second direction at a third speed to move the first detection target portion from the first position by the movement distance, and moves the turret in the second direction at a fourth speed lower than the third speed to move the first detection target portion to the second position.

6. The automatic sample injection device according to claim 1, wherein the multiple detection target portions further include a second detection target portion arranged with a space from the first detection target portion, the first detection target portion is longer than the second detection target portion, and the controller acquires, from the signal, a length of any of the multiple detection target portions detected in the detection area, and determines, when the length is a predetermined threshold or more, that the first detection target portion has been detected in the detection area.

7. A method of adjusting a turret reference position to an origin in an automatic sample injection device including a turret having multiple detection target portions including a first detection target portion indicating the turret reference position and supported so as to move in a first direction and a second direction opposite to the first direction, a stepping motor moving the turret, and a sensor having a detection area including the origin and outputting a signal indicating a presence or absence of any of the multiple detection target portions in the detection area, comprising:

moving the turret to move the first detection target portion from an initial position at a start of return-to-origin control in the first direction;

slowing down and stopping the turret when the sensor detects the first detection target portion in the detection area while the first detection target portion is moving in the first direction;

acquiring information corresponding to a movement distance of the first detection target portion from a start of slowdown of the turret to stop of the turret;

moving the turret to move the first detection target portion in the second direction from a first position, at which the first detection target portion is positioned at the stop of the turret, by the movement distance;

moving the turret to move the first detection target portion in the second direction to a second position outside the detection area; and moving the turret to move the first detection target portion in the first direction from the second position to the origin.

\* \* \* \* \*